United States Patent
Kang et al.

(10) Patent No.: US 9,247,564 B2
(45) Date of Patent: Jan. 26, 2016

(54) METHOD AND APPARATUS FOR TRANSMITTING APERIODIC CHANNEL STATE INFORMATION IN WIRELESS COMMUNICATION SYSTEM

(75) Inventors: Ji Won Kang, Anyang-si (KR); Jin Young Chun, Anyang-si (KR); Ki Tae Kim, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

(21) Appl. No.: 14/125,051

(22) PCT Filed: Jun. 8, 2012

(86) PCT No.: PCT/KR2012/004516
§ 371 (c)(1),
(2), (4) Date: Dec. 9, 2013

(87) PCT Pub. No.: WO2012/169816
PCT Pub. Date: Dec. 13, 2012

(65) Prior Publication Data
US 2014/0126476 A1    May 8, 2014

Related U.S. Application Data

(60) Provisional application No. 61/495,396, filed on Jun. 10, 2011.

(51) Int. Cl.
*H04W 4/00* (2009.01)
*H04W 74/00* (2009.01)
(Continued)

(52) U.S. Cl.
CPC ......... *H04W 74/006* (2013.01); *H04L 1/0026* (2013.01); *H04L 1/0029* (2013.01); *H04L 5/0057* (2013.01)

(58) Field of Classification Search
None
See application file for complete search history.

(56) References Cited

U.S. PATENT DOCUMENTS

| 2009/0190528 A1 | 7/2009 | Chung et al. |
| 2010/0118817 A1 | 5/2010 | Damnjanovic et al. |

(Continued)

FOREIGN PATENT DOCUMENTS

| KR | 10-2011-0033974 A | 4/2011 |
| WO | WO 2010/106729 A1 | 9/2010 |

(Continued)

OTHER PUBLICATIONS

Samsung et al., "Correction of Text on Aperiodic CSI Triggering," 3GPP TSG RAN WG1 Meeting #64, R1-110734, Taipei, Taiwan, Feb. 21-25, 2011, pp. 1-4.

(Continued)

*Primary Examiner* — Phirin Sam
(74) *Attorney, Agent, or Firm* — Birch, Stewart, Kolasch & Birch, LLP

(57) ABSTRACT

The present invention provides a method of user equipment transmitting aperiodic channel state information and user equipment using the method. The method includes receiving a channel state information request for a plurality of reference signals, receiving the plurality of reference signals, generating channel state information on each of the plurality of reference signals in response to the channel state information request, and transmitting the channel state information through a Physical Uplink Shared Channel (PUSCH), wherein the channel state information request is included in only some of subframes in which the plurality of reference signals is received.

12 Claims, 12 Drawing Sheets

(51) Int. Cl.
*H04L 5/00* (2006.01)
*H04L 1/00* (2006.01)

(56) References Cited

U.S. PATENT DOCUMENTS

| | | | |
|---|---|---|---|
| 2011/0032895 A1* | 2/2011 | Englund et al. | 370/329 |
| 2011/0237282 A1* | 9/2011 | Geirhofer et al. | 455/509 |
| 2011/0317581 A1 | 12/2011 | Hoshino et al. | |
| 2012/0076017 A1* | 3/2012 | Luo et al. | 370/252 |
| 2012/0076040 A1 | 3/2012 | Hoshino et al. | |
| 2012/0093012 A1* | 4/2012 | Pedersen et al. | 370/252 |
| 2012/0113843 A1* | 5/2012 | Watfa et al. | 370/252 |
| 2012/0113849 A1* | 5/2012 | Luo et al. | 370/252 |
| 2012/0257553 A1 | 10/2012 | Noh et al. | |
| 2012/0275398 A1* | 11/2012 | Chen et al. | 370/329 |
| 2014/0321396 A1* | 10/2014 | Choi et al. | 370/329 |

FOREIGN PATENT DOCUMENTS

| | | |
|---|---|---|
| WO | WO 2010/140298 A1 | 12/2010 |
| WO | WO 2011/037427 A2 | 3/2011 |

OTHER PUBLICATIONS

LG Electronics, "Details of CSI Reporting in Time-domain eICIC", 3GPP TSG RAN WG1 Meeting #64, Agenda Item 6.2.6, Taipei, Taiwan, Feb. 21-25, 2011, 5 pages, R1-110891.

Samsung et al., "Correction of text on aperiodic CSI triggering", 3GPP TSG RAN WG1 Meeting#64, Agenda Item 6.2.1, Taipei, Taiwan, Feb. 21-25, 2011, pp. 1-4, R1-110734.

Huawei et al., "Triggering and transmission of aperiodic CSI reports," 3GPP TSG RAN WG1 Meeting #63, R1-105838, Jacksonville, USA, Nov. 15-19, 2010, pp. 1-7, XP050466693.

LG Electronics, "DL CC selection for aperiodic CSI triggering," 3GPP TSG RAN WG1 Meeting #63, R1-106134, Jacksonville, USA, Nov. 15-19, 2010, pp. 1-5, XP050489595.

* cited by examiner

METHOD AND APPARATUS FOR TRANSMITTING APERIODIC CHANNEL STATE INFORMATION IN WIRELESS COMMUNICATION SYSTEM

This application is the National Phase of PCT/KR2012/004516 filed on Jun. 8, 2012, which claims priority under 35 U.S.C. 119(e) to U.S. Provisional Application No. 61/495,396 filed on Jun. 10, 2011, all of which are hereby expressly incorporated by reference into the present application.

TECHNICAL FIELD

The present invention relates to wireless communication and, more particularly, to a method and apparatus in which user equipment transmits aperiodic channel state information in a wireless communication system.

BACKGROUND ART

The data transfer rate over a wireless communication network is recently rapidly increasing. This is because a variety of devices, such as smart phones and tablet PCs which require Machine-to-Machine (M2M) communication and a high data transfer rate, are appearing and spread. In order to meet a higher data transfer rate, carrier aggregation technology and cognitive radio technology for efficiently using more frequency bands and multiple antenna technology and multiple base station co-operation technology for increasing the data capacity within a limited frequency are recently are highlighted.

Furthermore, a wireless communication network is evolving toward a tendency that the density of accessible nodes around a user is increasing. Here, the term 'node' may mean antennas or a group of antennas which are spaced apart from one another in a Distributed Antenna System (DAS). However, the node is not limited to the meaning, but may be used as a broader meaning. That is, the node may become a pico eNB (PeNB), a home eNB (HeNB), a Remote Radio Head (RRH), a Remote Radio Unit (RRU), or a relay. A wireless communication system including nodes having a high density may have higher system performance through cooperation between nodes. That is, if the transmission and reception of each node are managed by one control station so that the nodes are operated as antennas or a group of antennas for one cell, the node may have much more excellent system performance as compared with when the nodes do not cooperate with each other and thus each node operated as an independent Base Station (BS) (or an Advanced BS (ABS), a Node-B (NB), an eNode-B (eNB), or an Access Point (AP)). A wireless communication system including a plurality of nodes is hereinafter referred to as a multi-node system.

In a multi-node system, a node which sends a signal to user equipment may be different every user equipment, and a plurality of the nodes may be configured. Here, the nodes may send different reference signals. The reference signals transmitted by the respective nodes may be transmitted in different subframes because the reference signals have different subframe offset values although they have the same transmission cycle. In this case, it may be necessary for a base station to request user equipment to measure a plurality of reference signals transmitted in different subframes and feed back the measurement. In the prior art, a channel state information request field is transmitted in each downlink subframe in which a reference signal, that is, the subject of measurement is transmitted. The conventional method is problematic in that radio resources are wasted because a channel state information request field must be repeatedly transmitted.

SUMMARY OF INVENTION

Technical Problem

An object of the present invention is to provide a method and apparatus for transmitting aperiodic channel state information in a wireless communication system.

Solution to Problem

In an aspect, a method of User Equipment (UE) transmitting aperiodic channel state information is provided. The method comprising: receiving a channel state information request for a plurality of reference signals; receiving the plurality of reference signals; generating channel state information on each of the plurality of reference signals in response to the channel state information request; and transmitting the channel state information through a Physical Uplink Shared Channel (PUSCH), wherein the channel state information request is included in only some of subframes in which the plurality of reference signals is received.

The channel state information request may be included Downlink Control Information (DCI) on which the PUSCH is scheduled.

The plurality of reference signals may be placed in a plurality of downlink subframes.

The method may further comprises: receiving reference signal configuration information on the plurality of reference signals.

The channel state information may be transmitted through a plurality of the PUSCHs placed in a plurality of uplink subframes.

The plurality of PUSCHs may be indicated by a plurality of pieces of scheduling information included in DCI including the channel state information request.

The plurality of PUSCHs may be indicated by a piece of scheduling information included in DCI including the channel state information request and information indicating a number of the plurality of PUSCHs.

The channel state information may be generated by measuring reference signals in a first downlink subframe in which the channel state information request is received and in a second downlink subframe placed prior to the first downlink subframe.

The channel state information may be generated by measuring reference signals in a first downlink subframe in which the channel state information request is received and in a second downlink subframe placed posterior to the first downlink subframe.

In another aspect, a user equipment (UE) is provided. The UE comprises: a Radio Frequency (RF) unit configured to transmit and receive radio signals; and a processor coupled to the RF unit, wherein the processor receives a channel state information request for a plurality of reference signals, receives the plurality of reference signals, generates channel state information on each of the plurality of reference signals in response to the channel state information request, and transmits the channel state information through a Physical Uplink Shared Channel (PUSCH), wherein the channel state information request is included in only some of subframes in which the plurality of reference signals is received.

The channel state information request may be included Downlink Control Information (DCI) on which the PUSCH is scheduled.

The plurality of reference signals may be placed in a plurality of downlink subframes.

The processor further receives reference signal configuration information on the plurality of reference signals.

The channel state information may be generated by measuring reference signals in a first downlink subframe in which the channel state information request is received and in a second downlink subframe placed prior to the first downlink subframe.

The channel state information may be generated by measuring reference signals in a first downlink subframe in which the channel state information request is received and in a second downlink subframe placed posterior to the first downlink subframe.

Advantageous Effects of Invention

In a multi-node system, nodes may send different reference signals, and a plurality of nodes may be allocated to single user equipment. If a base station requests aperiodic channel state information feedback, user equipment may measure a plurality of reference signals and feed back aperiodic channel state information. Unlike in the prior art, a base station may request channel state information feedback for a plurality of reference signals by sending only a channel state information request field once. Accordingly, the waste of radio resources can be prevented.

MODE FOR THE INVENTION

The following technologies may be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using radio technology, such as Universal Terrestrial Radio Access (UTRA) or CDMA2000. TDMA may be implemented using radio technology, such as Global System for communications (GSM)/General Packet Radio Service (GPRS)/Enhanced Data Rates for GSM Evolution (EDGE). OFDMA may be implemented using radio technology, such as and Electronics Engineers (IEEE) 802.11 (Wi-Fi), IEEE 802.16 (WiMAX), IEEE 802.20, or Evolved UTRA (E-UTRA). IEEE 802.16m is an evolution of IEEE 802.16e, and it provides backward compatibility with systems based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using E-UTRA, and it adopts OFDMA in downlink and adopts SC-FDMA in uplink. LTE-Advanced (LTE-A) is the evolution of LTE.

Figure 1:
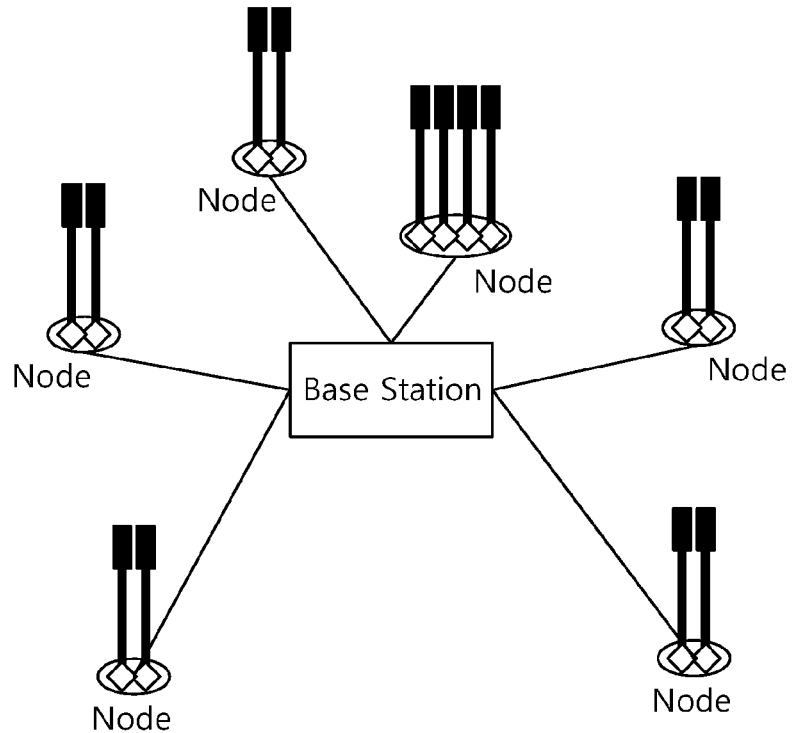
FIG. 1 shows an example of a multi-node system.

FIG. 1 shows an example of a multi-node system.

Referring to FIG. 1, the multi-node system includes a BS and a plurality of nodes.

In FIG. 1, the node may mean a macro eNB, a pico BS (PeNB), a home eNB (HeNB), a Remote Radio Head (RRH), a relay, or a distributed antenna. The node is also called a point.

In a multi-node system, if the transmission and reception of all nodes are managed by one BS controller and thus each of the nodes is operated as one cell, this system may be considered as a Distributed Antenna System (DAS) which forms one cell. In a DAS, each node may be assigned each node ID or the nodes may be operated as a set of some antennas within a cell without individual node IDs. In other words, a DAS refers to a system in which antennas (i.e., nodes) are distributed and placed at various positions within a cell and the antennas are managed by a BS. The DAS differs from a conventional centralized antenna system (CAS) in which the antennas of a BS are concentrated on the center of a cell and disposed.

In a multi-node system, if each node has each cell ID and performs scheduling and handover, it may be considered as a multi-cell (e.g., a macro cell/femto cell/pico cell) system. If the multi-cells are configured in an overlapping manner according to the coverage, this is called a multi-tier network.

Figure 2:
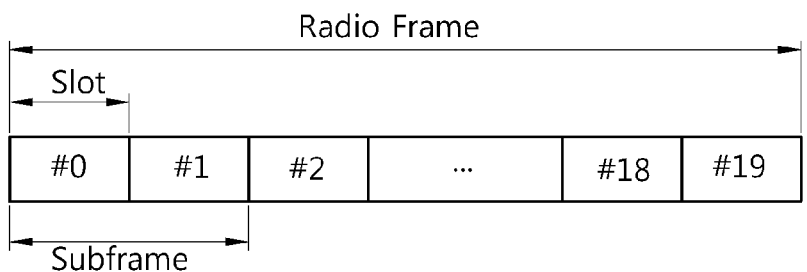
FIG. 2 shows the structure of a Frequency Division Duplex (FDD) radio frame in 3GPP LTE.

FIG. 2 shows the structure of a Frequency Division Duplex (FDD) radio frame in 3GPP LTE. This radio frame structure is called a frame structure type 1.

Referring to FIG. 2, the FDD radio frame includes 10 subframes, and one subframe is defined by two consecutive slots. The time taken for one subframe to be transmitted is called a Transmission Time Interval (TTI). The time length of a radio frame $T_f=307200*T_s=10$ ms and consists of 20 slots. The time length of one slot $T_{slot}=15360*T_s=0.5$ ms, and the slots are numbered 0 to 19. Downlink (DL) in which each node or BS sends a signal to UE and uplink (UL) in which UE sends a signal to each node or BS are divided in the frequency region.

Figure 3:
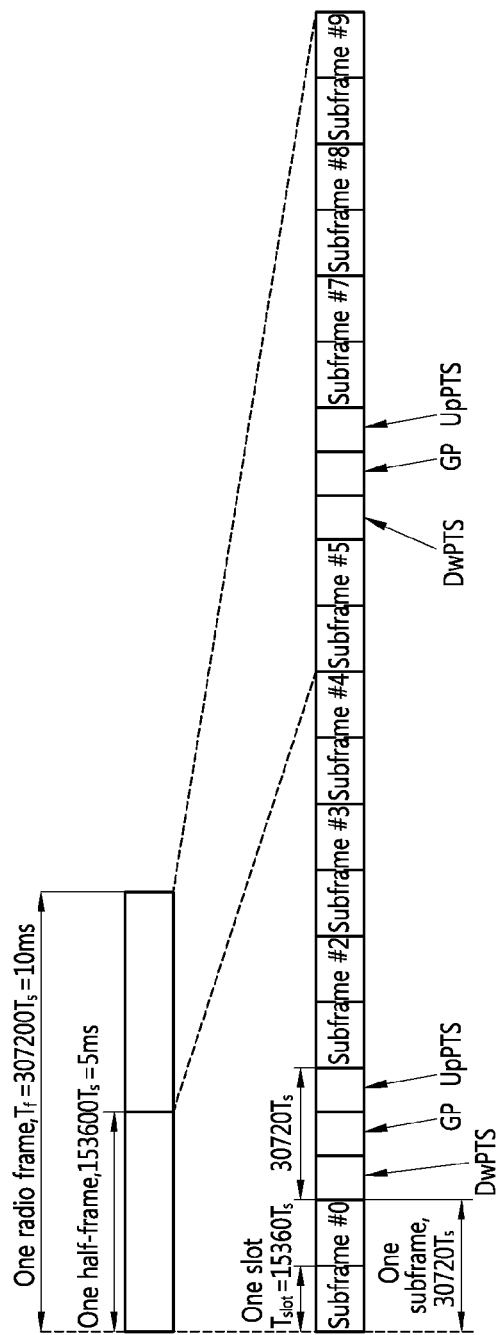
FIG. 3 shows a Time Division Duplex (TDD) radio frame structure in 3GPP LTE.

FIG. 3 shows a Time Division Duplex (TDD) radio frame structure in 3GPP LTE. This radio frame structure is called a frame structure type 2.

Referring to FIG. 3, the TDD radio frame has a length of 10 ms and consists of two half-frame each having a length of 5 ms. Furthermore, one half-frame consists of 5 subframes each having a length of 1 ms. One subframe is designated as one of a UL subframe, a DL subframe, and a special subframe. One radio frame includes at least one UL subframe and at least one DL subframe. One subframe is defined by two consecutive slots. For example, the length of one subframe may be 1 ms, and the length of one slot may be 0.5 ms.

The special subframe is a specific period for separating UL and DL from each other between a UL subframe and a DL subframe. One radio frame includes at least one special subframe. The special subframe includes a Downlink Pilot Time Slot (DwPTS), a guard period, and an Uplink Pilot Time Slot (UpPTS). The DwPTS is used for initial cell search, synchronization, or channel estimation. The UpPTS is used for channel estimation in a BS and UL transmission synchronization of UE. The guard period is a period where interference occurring in UL owing to the multi-path delay of a DL signal is removed between UL and DL.

In the FDD and TDD radio frames, one slot includes a plurality of Orthogonal Frequency Division Multiplexing (OFDM) symbols in the time domain and includes a plurality of Resource Blocks (RBs) in the frequency domain. The OFDM symbol is for representing one symbol period because 3GPP LTE uses OFDMA in DL and may be called another term, such as an SC-FDMA symbol, according to a multiple access scheme. An RB is a unit of resource allocation and includes a plurality of contiguous subcarriers in one slot.

The structure of the radio frame is only illustrative, and the number of subframes included in the radio frame, the number of slots included in the subframe, and the number of OFDM symbols included in the slot may be changed in various ways.

Figure 4:
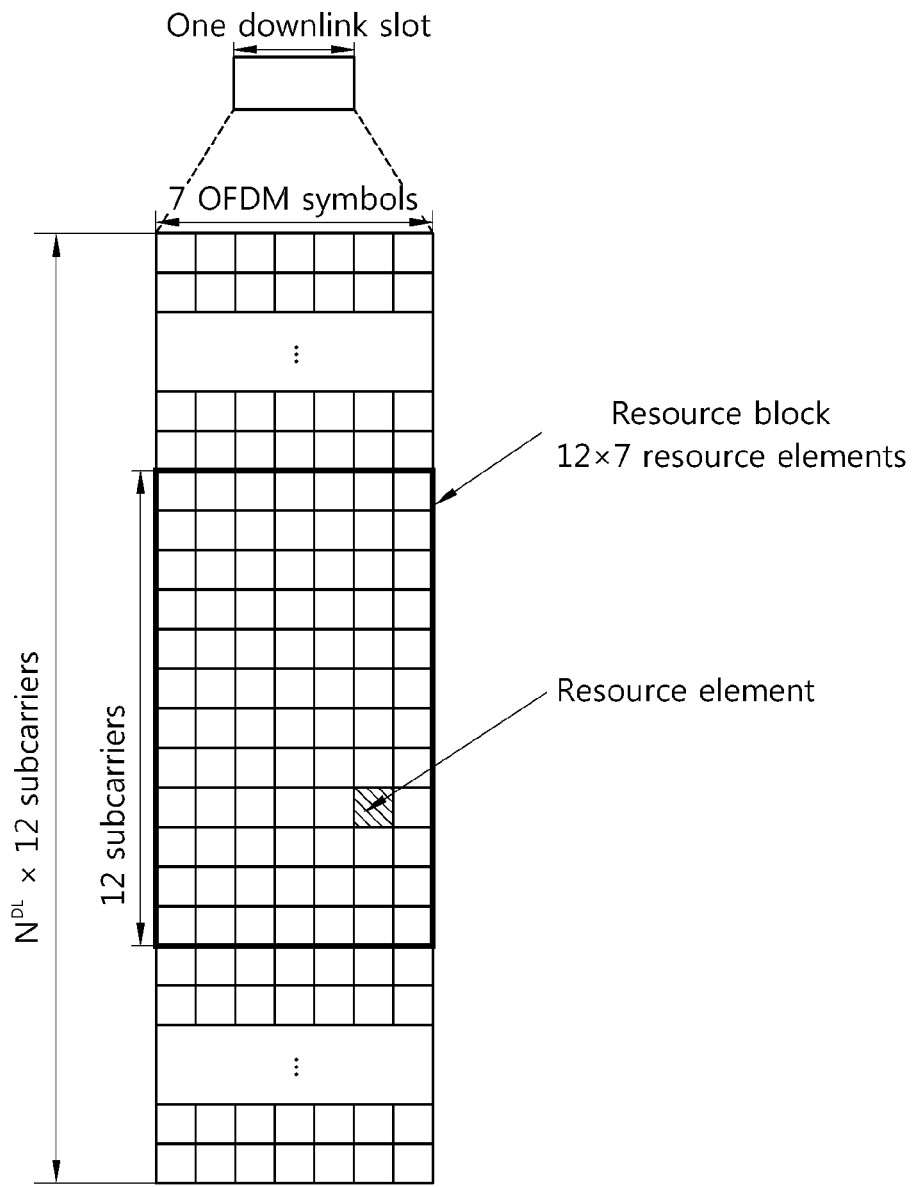
FIG. 4 illustrates a resource grid for one DL slot.

FIG. 4 illustrates a resource grid for one DL slot.

Referring to FIG. 4, one DL slot includes a plurality of OFDM symbols in the time domain. Here, one DL slot is illustrated as including 7 OFDMA symbols, and one RB is illustrated as including 12 subcarriers in the frequency domain, but not limited thereto.

Each element on the resource grid is called a resource element, and one RB includes 12×7 resource elements. The number NDL of RBs included in a DL slot depends on a DL transmission bandwidth configuration in a cell. The resource grid for the DL slot may also be applied to an UL slot.

Figure 5:
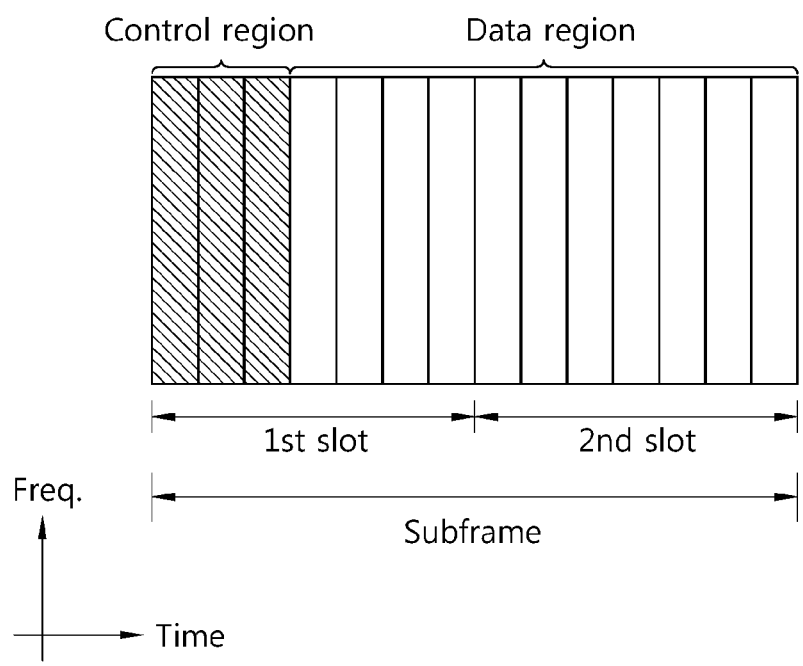
FIG. 5 shows an example of a DL subframe structure.

FIG. 5 shows an example of a DL subframe structure.

Referring to FIG. 5, the subframe includes two contiguous slots. A maximum of the former 3 OFDM symbols in the first slot of the subframe may correspond to a control region to which DL control channels are allocated, and the remaining OFDM symbols may correspond to a data region to which Physical Downlink Shared Channels (PDSCHs) are allocated.

The DL control channel includes a Physical Control Format Indicator Channel (PCFICH), a Physical Downlink Control Channel (PDCCH), a Physical Hybrid-ARQ Indicator Channel (PHICH), etc. A PCFICH transmitted in the first OFDM symbol of a subframe carries information about the number of OFDM symbols (i.e., the size of a control region) used to transmit control channels within the subframe. Control information transmitted through the PDCCH is called Downlink Control Information (DCI). DCI comprises UL resource allocation information, DL resource allocation information, a UL transmit power control command for specific UE groups, etc. DCI has various formats. A DCI format 0 is used for PUSCH scheduling. Information (field) transmitted through the DCI format 0 is as follows.

1) A flag for distinguishing the DCI format 0 and a DCI format 1A (if the flag is 0, it indicates the DCI format 0, and if the flag is 1, it indicates the DCI format 1A), 2) A hopping flag (1 bit), 3) RB designation and hopping resource allocation, 4) A modulation and coding scheme and redundancy version (5 bits), 5) A new data indicator (1 bit), 6) A TPC command (2 bits) for a scheduled PUSCH, 7) A cyclic shift (3 bits) for a DM-RS, 8) An UL index, 9) A DL designation index (only in TDD), 10) A CQI request, etc. If the number of information bits in the DCI format 0 is smaller than the payload size of the DCI format 1A, '0' is padded so that the DCI format 1A is identical with the payload size.

A DCI format 1 is used for one PDSCH codeword scheduling. The DCI format 1A is used for the compact scheduling of one PDSCH codeword or a random access process. A DCI format 1B includes precoding information, and it is used for compact scheduling for one PDSCH codeword. A DCI format 1C is used for very compact scheduling for one PDSCH codeword. A DCI format 1D includes precoding and power offset information, and it is used for compact scheduling for one PDSCH codeword. A DCI format 2 is used for PDSCH designation for a closed-loop MIMO operation. A DCI format 2A is used for PDSCH designation for an open-loop MIMO operation. A DCI format 3 is used to transmit a TPC command for a PUCCH and a PUSCH through power adjustment of 2 bits. A DCI format 3A is used to transmit a TPC command for a PUCCH and a PUSCH through power adjustment of 1 bit.

A PHICH carries an Acknowledgement (ACK)/Not-Acknowledgement (NACK) signal for the Hybrid Automatic Repeat Request (HARQ) of UL data. That is, an ACK/NACK signal for UL data transmitted by UE is transmitted by a BS on a PHICH.

A PDSCH is a channel on which control information and/or data is transmitted. UE may read data transmitted through a PDSCH by decoding control information transmitted through a PDCCH.

Figure 6:
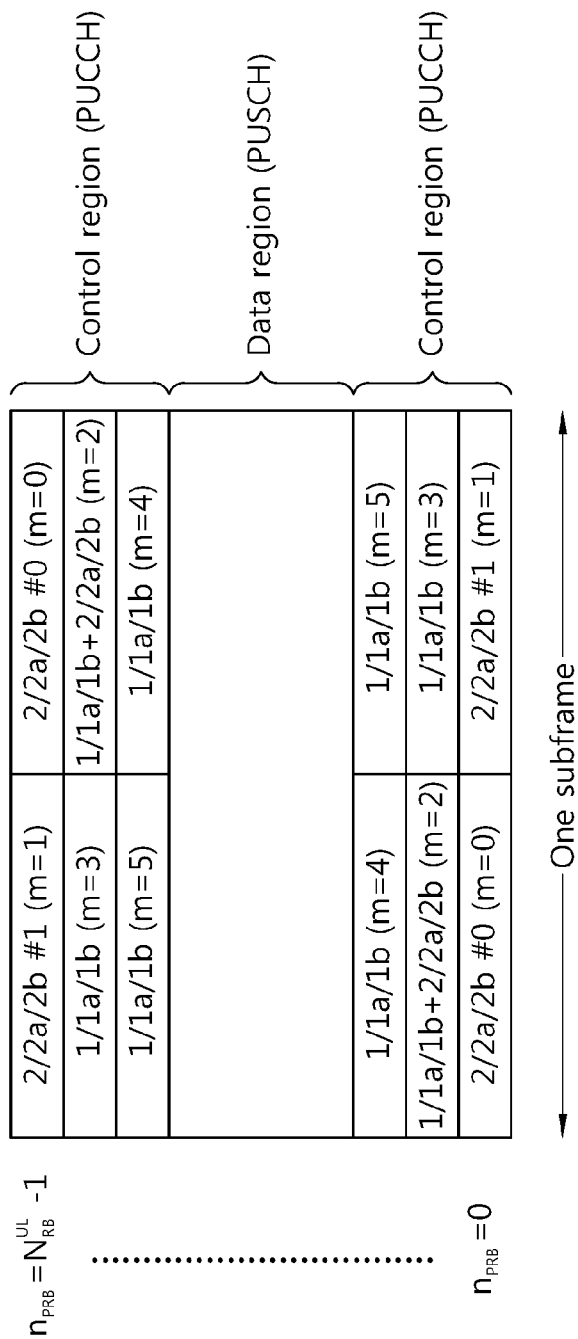
FIG. 6 shows the structure of a UL subframe.

FIG. 6 shows the structure of a UL subframe.

The UL subframe may be divided into a control region and a data region in the frequency domain. A Physical Uplink Control Channel (PUCCH) on which Uplink Control Information (UCI) is transmitted is allocated to the control region. A Physical Uplink Shared Channel (PUSCH) on which UL data and/or UL control information is transmitted is allocated to the data region. In this meaning, the control region may be called a PUCCH region, and the data region may be called a PUSCH region. UE may support the simultaneous transmission of a PUSCH and a PUCCH or may not support the simultaneous transmission of a PUSCH and a PUCCH according to configuration information indicated by a higher layer.

A PUSCH is mapped to an Uplink Shared Channel (UL-SCH), that is, a transport channel. UL data transmitted on the PUSCH may be a transport block, that is, a data block for an UL-SCH transmitted for a TTI. The transport block may be user information. Alternatively, the UL data may be multiplexed data. The multiplexed data may include a transport block and UL control information for an UL-SCH which are multiplexed. For example, UL control information multiplexed with UL data may include a Channel Quality Indicator (CQI), a Precoding Matrix Indicator (PMI), a Hybrid Automatic Repeat request (HARM), acknowledgement/not-acknowledgement (ACK/NACK), a Rank Indicator (RI), a Precoding Type Indication (PTI), and so on. What UL control information, together with UL data, is transmitted in the data region as described above is called the piggyback transmission of UCI. Only UL control information may be transmitted in a PUSCH.

A PUCCH for one UE is allocated as a Resource Block (RB) pair in a subframe. Resource blocks belonging to a RB pair occupy different subcarriers in a first slot and a second slot. A frequency occupied by a resource block belonging to an RB pair allocated to a PUCCH is changed on the basis of a slot boundary. This is called that the frequency of the RB pair allocated to the PUCCH has been frequency-hopped at the boundary of a slot. A frequency diversity gain may be obtained when UE sends UL control information through different subcarriers according to a lapse of time.

A PUCCH carries various types of control information according to a format. A PUCCH format 1 carries a Scheduling Request (SR). Here, an On-Off Keying (OOK) scheme may be used. A PUCCH format 1a carries an Acknowledgement/Non-Acknowledgement (ACK/NACK) modulated according to a Binary Phase Shift Keying (BPSK) scheme for one codeword. A PUCCH format 1b carries ACK/NACK modulated according to a Quadrature Phase Shift Keying (QPSK) scheme for two codewords. A PUCCH format 2 carries a Channel Quality Indicator (CQI) modulated according to a QPSK scheme. PUCCH formats 2a and 2b carry a CQI and ACK/NACK. A PUCCH format 3 is modulated according to a QPSK scheme, and it may carry a plurality of ACK/NACK and SRs.

Each PUCCH format is mapped to a PUCCH region and transmitted. For example, the PUCCH formats 2/2a/2b may be mapped to the RB (in FIG. 6, m=0,1) of the edge of a band allocated to UE and then transmitted. A mixed PUCCH RB may be mapped to an RB (e.g., m=2) adjacent in the direction of the center of the band in the RB to which the PUCCH formats 2/2a/2b are allocated and then transmitted. The PUCCH formats 1/1a/1b on which an SR and ACK/NACK are transmitted may be disposed in an RB having m=4 or m=5. UE may be informed of the number $N^{(2)}_{RB}$ of RBs that may be used in the PUCCH formats 2/2a/2b on which a CQI may be transmitted through a broadcasted signal.

All PUCCH formats use the Cyclic Shift (CS) of a sequence in each OFDM symbol. The CS sequence is generated by cyclically shifting a base sequence by a specific CS amount. The specific CS amount is indicated by a CS index.

An example in which the base sequence $r_u(n)$ is defined is as follows.

$$r_u(n) = e^{jb(n)\pi/4} \quad \text{[Equation 1]}$$

In Equation 1, u is a root index, n is an element index, $0 \le n \le N-1$, and N is the length of the base sequence. b(n) is defined in section 5.5 of 3GPP TS 36.211 V8.7.0.

The length of the sequence is equal to the number of elements included in the sequence. u may be defined by a cell identifier (ID), a slot number within a radio frame, etc. Assuming that a base sequence is mapped to one resource block within the frequency domain, the length N of the base sequence is 12 because one resource block includes 12 sub-carriers. A different base sequence is defined according to a different root index.

A cyclic-shifted sequence $r(n, I_{cs})$ may be generated by cyclically shifting the base sequence r(n) as in Equation 2 below.

$$r(n, I_{cs}) = r(n) \cdot \exp\left(\frac{j2\pi I_{cs} n}{N}\right), \quad \text{[Equation 2]}$$
$$0 \le I_{cs} \le N-1$$

In Equation 2, $I_{cs}$ is a CS index indicating a CS amount ($0 \le I_{cs} \le N-1$).

Available CS indices of the base sequence refer to a CS index that may be derived from the base sequence according to a CS interval. For example, if the length of a base sequence is 12 and a CS interval is 1, a total number of available CS indices of the base sequence is 12. In contrast, if the length of a base sequence is 12 and a CS interval is 2, a total number of available CS indices of the base sequence is 6. The orthogonal sequence index i, the CS index $I_{cs}$, and the resource block index m are parameters necessary to configure a PUCCH and are resources used to distinguish PUCCHs (or UEs) from each other.

In 3GPP LTE, in order for UE to obtain 3 parameters for configuring a PUCCH, resource indices (also called a PUCCH resource index) $n^{(1)}_{PUCCH}$, $n^{(2)}_{PUCCH}$ are defined. Here, $n^{(1)}_{PUCCH}$ is a resource index for the PUCCH formats 1/1a/1b, and $n^{(2)}_{PUCCH}$ is a resource index for the PUCCH formats 2/2a/2b. A resource index $n^{(1)}_{CCE} = n^{(1)}_{PUCCH}$, and $n_{CCE}$ is the number of a first CCE which is used to transmit a relevant DCI (i.e., the index of a first CCE which is used for relevant PDCCH), and $N^{(1)}_{PUCCH}$ is a parameter that a BS informs UE the parameter through a high layer message. Detailed contents are as follows.

- ■ SPS(semi-persistent scheduled)-UE: defined by RRC
- ■ Scheduling request: defined by RRC
- ■ Otherwise: $n_{PUCCH}^{(1)} = n_{CCE} + N_{PUCCH}^{(1)}$ (refer TS36.213 subclause 10.1[2])
  - ◆ $n_{CCE}$: First CCE(control channel elements) index of PDCCH
  - ◆ $N_{PUCCH}^{(1)} - c \cdot N_{sc}^{RB}/\Delta_{shift}^{PUCCH}$
  - ◆ $c = \begin{cases} 3 & \text{normal cyclic prefix} \\ 2 & \text{extended cyclic prefix} \end{cases}$
  - ◆ $N_{sc}^{RB} = 12$
  - ◆ $\Delta_{shift}^{PUCCH} \subset \{1,2,3\}$ $n^{(2)}_{PUCCH}$ is given a UE-specific way and is semi-statically configured by a higher layer signal, such as RRC. In LTE, $n^{(2)}_{PUCCH}$ is included in an RRC message called 'CQI-ReportConfig'.

UE determines an orthogonal sequence index, a CS index, etc. using the resource indices $n^{(1)}_{PUCCH}$, $n^{(2)}_{PUCCH}$.

UE transmits a PUCCH using physical resources mapped to a resource index.

Figure 7:
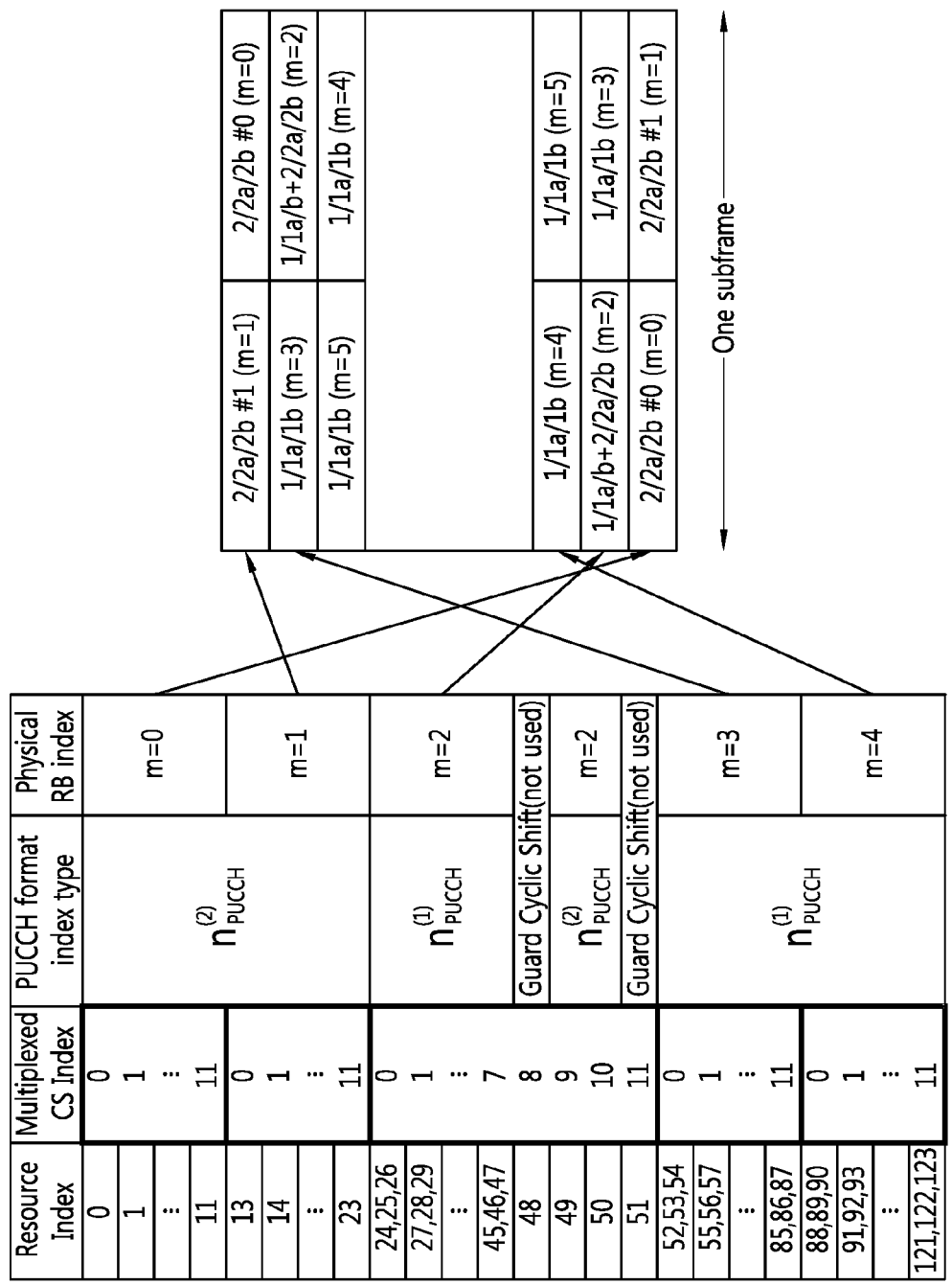
FIG. 7 shows an example in which a resource index is mapped to physical resources.

FIG. 7 shows an example in which a resource index is mapped to physical resources.

UE calculates a resource block index m based on a resource index, allocates physical resources according to a PUCCH format, and transmit the PUCCH. The following relationship exists between a resource index allocated to each UE and a mapped physical resource block.

- System Parameters
  - $\Delta_{shift}^{PUCCH} = 1$ → 12 (available cyclic shift value)
  - c = 3 → Normal CP
  - $N_{PUCCH}^{(1)} = c \cdot N_{sc}^{RB} / \Delta_{shift}^{PUCCH} = 36$
  - $N_{RB}^{(2)} = 2 \cdot N_{sc}^{RB} = 24$ → Bandwidth available for use by PUCCH formats 2/2a/2b (expressed in multiple of $N_{sc}^{RB}$)
  - $N_{cs}^{(1)} = 7$ → Number of cyclic shifts used for PUCCH formats 1/1a/1b in a resource block with a mix of formats 1/1a/1b and 2/2a/2b In a multi-node system, a different reference signal may be transmitted from each node or each node group. First, a reference signal is described.

In LTE Rel-8, for channel measurement and channel estimation for a PDSCH, a Cell-specific Reference Signal (CRS) is used.

Figure 8:
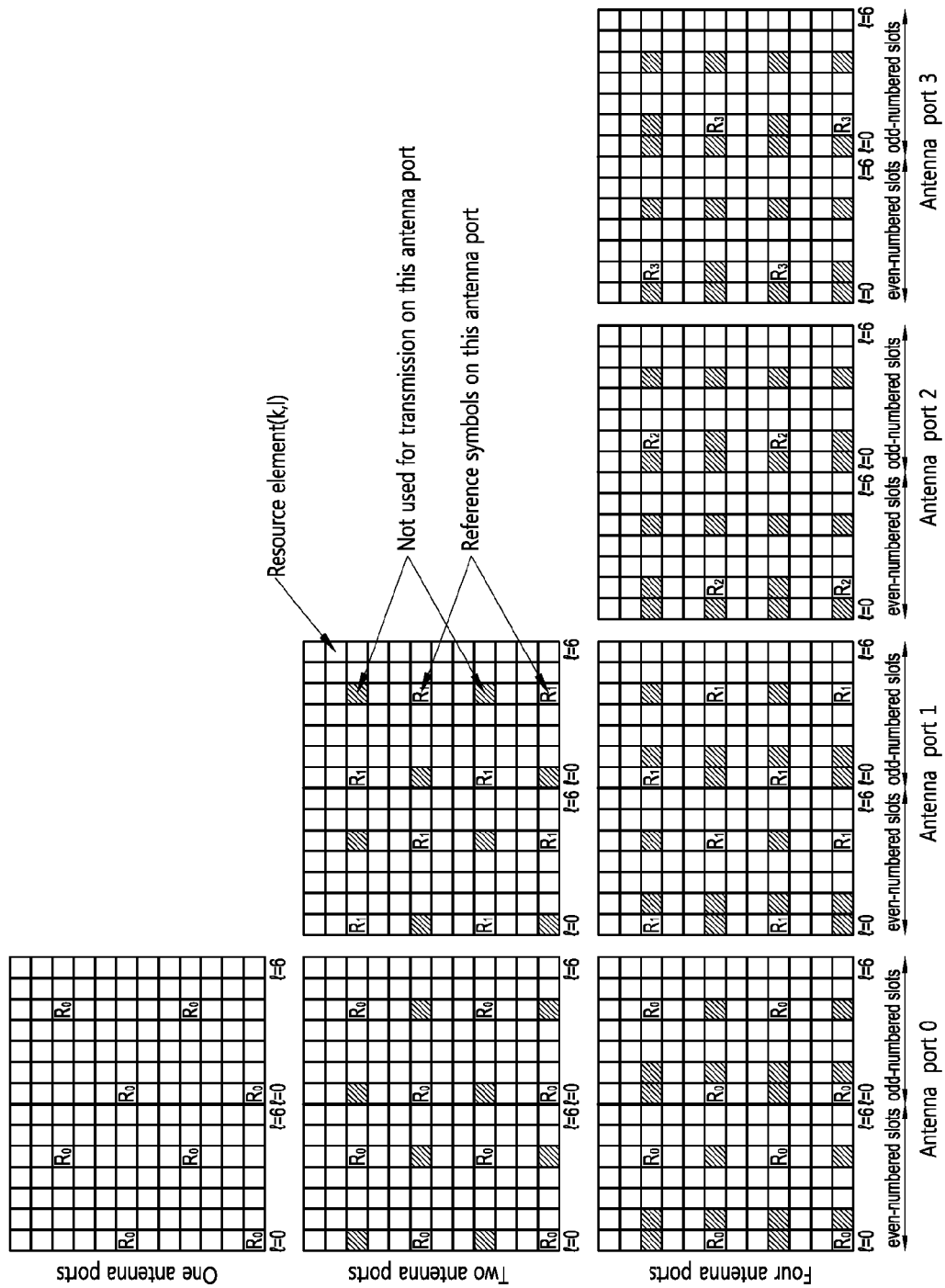
FIG. 8 shows the mapping of a CRS in a normal cyclic prefix (CP).

FIG. 8 shows the mapping of a CRS in a normal cyclic prefix (CP).

Referring to FIG. 8, in case of multiple antenna transmission using a plurality of antennas, a resource grid exists in each antenna, and at least one reference signal for an antenna may be mapped to each resource grid. A reference signal for each antenna includes reference symbols. In FIG. 8, Rp indicates the reference symbol of an antenna port p (p∈{0, 1, 2, 3}). R0 to R3 are not mapped to overlapping resource elements.

In one OFDM symbol, each Rp may be placed at 6 subcarrier intervals. The number of R0s and the number of R1s within a subframe are identical with each other, and the number of R2s and the number of R3s within a subframe are identical with each other. The number of R2s or R3s within a subframe is smaller than the number of R0s or R1s within the subframe. Rp is not used for any transmission through other antennas other than a No. p antenna.

In LTE-A, for channel measurement and channel estimation for a PDSCH, a Channel Status Information Reference Signal (CSI-RS) may be used separately from a CRS. The CSI-RS is described below.

A CSI-RS, unlike a CRS, includes a maximum of 32 different configurations in order to reduce Inter-Cell Interference (ICI) in a multi-cell environment including heterogeneous network environments.

A configuration for the CSI-RS is different according to the number of antenna ports within a cell and is given so that maximum different configurations between adjacent cells are configured. The CSI-RS is divided according to a CP type. The configuration for the CSI-RS is divided into a configuration applied to both a frame structure type 1 and a frame structure type 2 and a configuration applied to only the frame structure type 2 according to a frame structure type (the frame structure type 1 is FDD, and the frame structure type 2 is TDD).

The CSI-RS, unlike the CRS, supports a maximum of 8 antenna ports, and an antenna port p is supported by {15}, {15, 16}, {15,16,17,18}, {15, . . . , 22}. That is, the CSI-RS supports 1, 2, 4, or 8 antenna ports. An interval Δf between subcarriers is defined only for 15 kHz.

A sequence $r_{l,n_s}(m)$ for the CSI-RS is generated as in Equation below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad [\text{Equation 3}]$$

$$m = 0, 1, \ldots, N_{RB}^{max,DL} - 1$$

where, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 3, $n_s$ is a slot number within a radio frame, and l is an OFDM symbol number within the slot. c(i) is a pseudo random sequence and is started from each OFDM symbol as $c_{init}$. $N_{ID}^{cell}$ indicates a physical layer cell ID.

In subframes configured to transmit a CSI-RS, a reference signal sequence $r_{l,n_s}(m)$ is mapped to a complex value modulation symbol $a_{k,l}^{(p)}$ used as a reference symbol for an antenna port p.

A relationship between $r_{l,n_s}(m)$ and $a_{k,l}^{(p)}$ is defined as in Equation below.

[Equation 4]

$$a_{k,l}^{(p)} = w_{l''} \cdot r_{l,n_s}(m')$$

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & CSI \text{ reference signal configurations 0-19, normal cyclic prefix} \\ 2l'' & CSI \text{ reference signal configurations 20-31, normal cyclic prefix} \\ l'' & CSI \text{ reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 4, (k', l') and $n_s$ are given in Table 1 and Table 2 below. A CSI-RS may be transmitted in a DL slot in which ($n_s$ mod 2) meets the conditions of Table 1 and Table 2 (mod means a modular operation, that is, mod means the remainder obtained by dividing $n_s$ by 2).

Table below shows a CSI-RS configuration for a normal CP.

TABLE 1

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |

TABLE 1-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table below shows a CSI-RS configuration for an extended CP.

TABLE 2

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

A subframe including a CSI-RS must satisfy Equation below.

$$(10n_f + \lfloor n_s/2 \rfloor - \Delta_{CSI-RS}) \bmod T_{CSI-RS} = 0 \quad \text{[Equation 5]}$$

Furthermore, the CSI-RS may be transmitted in a subframe satisfying the condition of Table 3.

Table 3 shows a CSI-RS subframe configuration related to a duty cycle. $n_f$ is a system frame number.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

In Table 3, 'CSI-RS-SubframeConfig', that is, $I_{CSI-RS}$ is a value given by a higher layer, and it indicates a CSI-RS subframe configuration. $T_{CSI-RS}$ indicates a cell-specific subframe configuration period, and $\Delta_{CSI-RS}$ indicates a cell-specific subframe offset. A CSI-RS supports five types of duty cycles according to a CQI/CSI feedback, and it may be transmitted with a different subframe offset in each cell.

Figure 9:
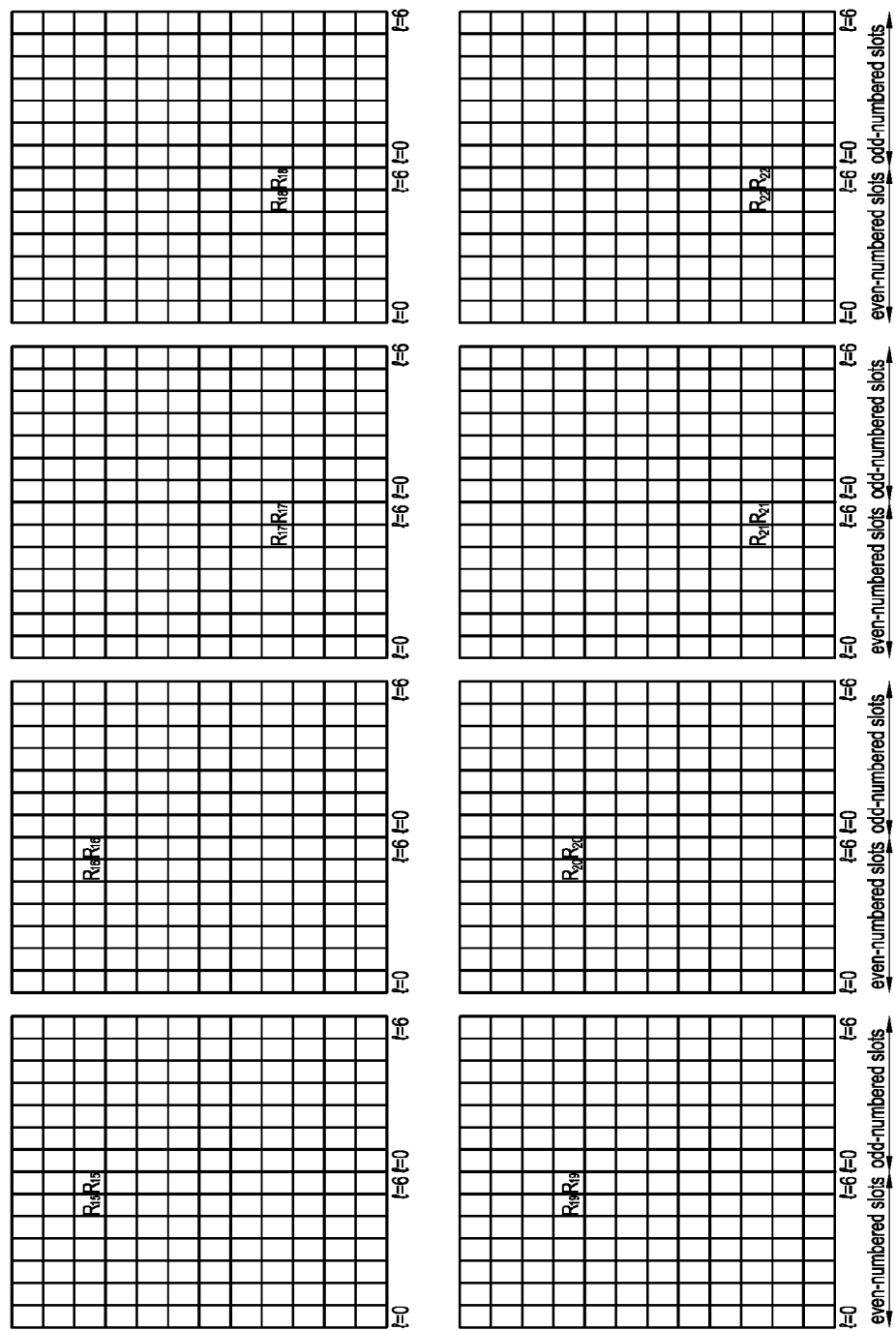
FIG. 9 shows the mapping of a CSI-RS for a CSI-RS configuration 0 in a normal CP.

FIG. 9 shows the mapping of a CSI-RS for a CSI-RS configuration 0 in a normal CP.

Referring to FIG. 9, two antenna ports transmit a CSI-RS using, for example, two same contiguous resource elements for p={15, 16}, {17, 18}, {19, 20}, {21, 22}, but using an Orthogonal Cover Code (OCC).

A plurality of CSI-RS configurations can be used in a cell. In this case, one CSI-RS configuration in which UE assumes non-zero transmit power and one or non CSI-RS configuration in which UE assumes zero transmit power may be configured.

A CSI-RS is not transmitted in the following cases.
1. A special subframe of the frame structure type 2
2. When it is collided with a synchronization signal, a physical broadcast channel (PBCH), or a system information block (SIB)
3. A subframe in which a paging message is transmitted A resource element (k,l) used to transmit a CSI-RS for a specific antenna port of a set S is not used to transmit a PDSCH for a specific antenna port in the same slot. Furthermore, the resource element (k,l) is not used to transmit a CSI-RS for another specific antenna port other than the set S in the same slot. Here, antenna ports included in the set S include {15, 16}, {17,18}, {19,20}, and {21, 22}.

Parameters necessary to transmit the CSI-RS include 1. a CSI-RS port number, 2. CSI-RS configuration information, 3. a CSI-RS subframe configuration $I_{CSI-RS}$, 4. a subframe configuration periodicity $T_{CSI-RS}$, 5. a subframe offset $\Delta_{CSI-RS}$, and so on. The parameters are cell-specific and are given through higher layer signaling.

A BS may apply a reference signal, such as a CRS and a CSI-RS, so that UE may identify each node in a multi-node system.

UE may measure the reference signal, generate Channel State Information (CSI), and then report or feed back the CSI to a BS or a node. CSI includes a CQI, a PMI, an RI, etc.

A method of sending Channel State Information (CSI) includes a periodic transmission method and an aperiodic transmission method.

In the periodic transmission method, CSI may be transmitted through a PUCCH or a PUSCH. The aperiodic transmission method is performed in such a manner that, if more precise CSI is necessary, a BS requests CSI from UE. A BS sends a CSI request (e.g., a CQI request included in the DCI format 0), and UE measures the reference signal of a subframe including the CSI request and feeds back CSI. The aperiodic transmission method is performed through a PUSCH. Since a PUSCH is used, capacity is greater and detailed channel state reporting possible. If periodic transmission and aperiodic transmission collide with each other, only aperiodic transmission is performed.

An aperiodic CSI feedback is performed when there is a request from a BS. If UE is accessed, a BS may request a CSI feedback from the UE when sending a random access response grant to the UE. In some embodiments, a BS may request a CSI feedback from UE by using a DCI format in which UL scheduling information is transmitted. A CSI request field requesting a CSI feedback comprises 1 bit or 2 bits. If the CSI request field is 1 bit, in case of '0', a CSI report is not triggered. In case of '1', a CSI report is triggered. In case of 2 bits, the following Table is applied.

TABLE 4

| VALUE OF CSI REQUEST FIELD | DESCRIPTION |
|---|---|
| '00' | No aperiodic CSI report is triggered |
| '01' | Aperiodic CSI report triggered for serving cell $^c$ |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

When a CSI report is triggered by a CSI request field, UE feeds back CSI through PUSCH resources designated in the DCI format 0. Here, what CSI will be fed back is determined according to a reporting mode. For example, which one of a wideband CQI, a UE-selective CQI, and a higher layer configuration CQI will be fed back is determined according to a reporting mode. Furthermore, what kind of a PMI will be fed back is also determined along with a CQI. A PUSCH reporting mode is semi-statically configured through a higher layer message, and an example thereof is listed in Table 5 below.

TABLE 5

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

Unlike aperiodic CSI feedback transmitted only when it is triggered through a PDCCH, periodic CSI feedback is semi-statically configured through a higher layer message. The periodicity $N_{pd}$ and subframe offset $N_{OFFSET,CQI}$ of periodic CSI feedback are transferred to UE as a higher layer message (e.g., an RRC message) through a parameter called 'cqi-pmi-ConfigIndex' (i.e., $I_{CQI/PMI}$). A relationship between the parameter $I_{CQI/PMI}$ and the periodicity and subframe offset is listed in Table 6 in case of FDD and in Table 7 in case of TDD.

TABLE 6

| $I_{CQI/PMI}$ | Value of $N_{pd}$ | Value of $N_{OFFSET,CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI}-2$ |
| $7 \leq I_{CQI/PMI} \leq 16$ | 10 | $I_{CQI/PMI}-7$ |

TABLE 6-continued

| $I_{CQI/PMI}$ | Value of $N_{pd}$ | Value of $N_{OFFSET,CQI}$ |
|---|---|---|
| $17 \leq I_{CQI/PMI} \leq 36$ | 20 | $I_{CQI/PMI}-17$ |
| $37 \leq I_{CQI/PMI} \leq 76$ | 40 | $I_{CQI/PMI}-37$ |
| $77 \leq I_{CQI/PMI} \leq 156$ | 80 | $I_{CQI/PMI}-77$ |
| $157 \leq I_{CQI/PMI} \leq 316$ | 160 | $I_{CQI/PMI}-157$ |
| $I_{CQI/PMI} = 317$ | | Reserved |
| $318 \leq I_{CQI/PMI} \leq 349$ | 32 | $I_{CQI/PMI}-318$ |
| $350 \leq I_{CQI/PMI} \leq 413$ | 64 | $I_{CQI/PMI}-350$ |
| $414 \leq I_{CQI/PMI} \leq 541$ | 128 | $I_{CQI/PMI}-414$ |
| $542 \leq I_{CQI/PMI} \leq 1023$ | | Reserved |

TABLE 7

| $I_{CQI/PMI}$ | Value of $N_{pd}$ | Value of $N_{OFFSET,CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI}-1$ |
| $6 \leq I_{CQI/PMI} \leq 15$ | 10 | $I_{CQI/PMI}-6$ |
| $16 \leq I_{CQI/PMI} \leq 35$ | 20 | $I_{CQI/PMI}-16$ |
| $36 \leq I_{CQI/PMI} \leq 75$ | 40 | $I_{CQI/PMI}-36$ |
| $76 \leq I_{CQI/PMI} \leq 155$ | 80 | $I_{CQI/PMI}-76$ |
| $156 \leq I_{CQI/PMI} \leq 315$ | 160 | $I_{CQI/PMI}-156$ |
| $316 \leq I_{CQI/PMI} \leq 1023$ | | Reserved |

A periodic PUCCH reporting mode is listed in Table below.

TABLE 8

| | | PMI Feedback Type | |
|---|---|---|---|
| | | No PMI | Single PMI |
| PUCCH CQI Feedback Type | Wideband (wideband CQI) | Mode1-0 | Mode1-1 |
| | UE selected (subband CQI) | Mode2-0 | Mode2-1 |

UE must measure the reference signal of a specific resource region in order to feed back CSI, for example, CQI. Resources that must be measured in order to generated CQI are called CQI reference resources. It is assuemd that UE feeds back CQI in a UL subframe n. Here, a CQI reference resource is defined as a group of DL physical resource blocks corresponding to a frequency band which is related to a CQI value in the frequency domain and is defined as one DL subframe $n-n_{CQI\_ref}$ in the time domain.

In periodic CQI feedback, $n_{CQI\_ref}$ is the smallest value from among 4 or more values corresponding to a valid DL subframe. In aperiodic CQI feedback, $n_{CQI\_ref}$ indicates a valid DL subframe including a UL DCI format includnig a relevant CQI request. That is, CQI reference resource is a valid DL subframe including a CQI request filed in aperiodic CQI feedback.

In aperiodic CQI feedback, if the DL subframe $n-n_{CQI\_ref}$ is received after a subframe including a CQI request included in a random access response grant, $n_{CQI\_ref}$ is 4, and the DL subframe $n-n_{CQI\_ref}$ corresponds to a valid DL subframe.

A DL subframe is considered as a valid DL subframe to a UE if it meets the following conditions.

1. The DL subframe is configured for the UE, 2. Except for transmission mode 9, the DL subframe is not a Multicast-Broadcast Single Frequency Network (MBSFN) subframe, 3. The DL subframe does not contain a DwPTS field in case the length of DwPTS field is 7680T, and less (here, 307200Ts=10 ms), 4. the DL subframe should not correspond to a configured measurement gap for the UE.

If a valid DL subframe for CQI reference resources does not exist, CQI feedback is omitted in UL subframe n.

In the layer domain, CQI reference resources are defined by any RI and PMI value on which the CQI is conditioned.

In CQI reference resources, UE is operated under the following assumption in order to derive a CQI index.

1. In CQI reference resources, the first 3 OFDM symbols are occupied by a control signal.

2. In CQI reference resources, there is no resource element used by a Primary Synchronization Signal (PSS), a Secondary Synchronization Signal (SSS), or a Physical Broadcast Channel (PBCH).

3. In CQI reference resources, the CP length of a non-MBSFN subframe is assumed.

4. Redundancy version 0

Table below shows the transmission modes of a PDSCH assumed for CQI reference resources.

TABLE 9

| Transmission mode | Transmission Scheme of PDSCH |
|---|---|
| 1 | Single-antenna port, port 0 |
| 2 | Transmit diversity |
| 3 | Transmit diversity if an associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, single-antenna port, port 0; otherwise transmit diversity |
| 8 | If UE is configured without PMI/RI reporting: if the number of PBCH antenna ports is one, single-antenna port, port 0; otherwise transmit diversity<br>If UE is configured with PMI/RI reporting: closed-loop spatial multiplexing |
| 9 | Closed-loop spatial multiplexing with up to 8 layer transmission, ports 7-14 |

In the transmission mode 9 and a feedback (reporting) mode thereof, UE performs channel measurement for calculating CQI based on only a CSI-RS. In other transmission modes and relevant reporting modes, UE performs channel measurement for calculating CQI based on a Cell-specific RS (CRS). UE reports the highest CQI index value of CQI indices 1 to 15 shown in Table below under a specific condition. The specific condition includes a modulation scheme corresponding to a CQI index and that a single PDSCH transport block having a transport block size must be received within a 0.1 error probability when the single PDSCH transport block occupies CQI reference resources.

A CQI index fed back by UE and its meanings are listed in Table below.

TABLE 10

| CQI INDEX | MODULATION | CODE RATE × 1024 | EFFICIENCY |
|---|---|---|---|
| 0 | | Out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |

TABLE 10-continued

| CQI INDEX | MODULATION | CODE RATE × 1024 | EFFICIENCY |
|---|---|---|---|
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In a multi-node system, a plurality of nodes or a node group may be allocated to UE, and different reference signals may be used in respective nodes or a node group. In this case, a BS may request aperiodic CSI feedback (reporting) for a plurality of reference signals from UE. In response to the request, the UE may measure the plurality of reference signals and report CSI (e.g., a CQI) on each of the reference signals.

Figure 10:
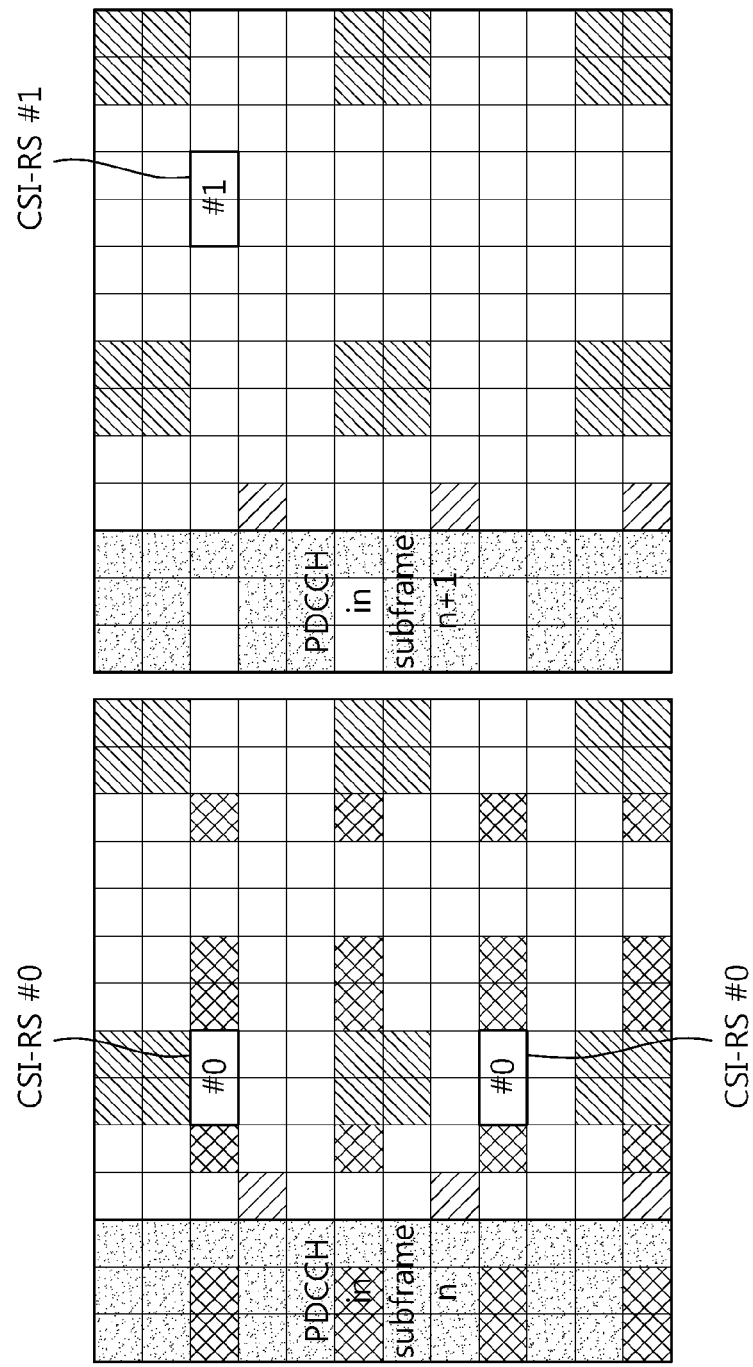
FIG. 10 illustrates a plurality of CSI-RSs that should be measured by one UE.

FIG. 10 illustrates a plurality of CSI-RSs that should be measured by one UE.

Referring to FIG. 10, a CSI-RS #0 and a CSI-RS #1 may be configured for UE. The CSI-RS #0 may be a CSI-RS transmitted by a node #N, and the CSI-RS #1 may be a CSI-RS transmitted by a node #M.

The transmission periodicity of the CSI-RS #0 may be identical with the transmission periodicity of the CSI-RS #1. For example, the CSI-RS #0 may be transmitted in a subframe n+10m (m is 0 or a natural number). The CSI-RS #1 may be transmitted in a subframe n+1+10m.

As shown in FIG. 10, CSI-RSs transmitted in different subframes may be configured for the same UE, but not limited thereto. That is, a plurality of CSI-RSs transmitted in the same subframe may be configured for the same UE.

Figure 11:
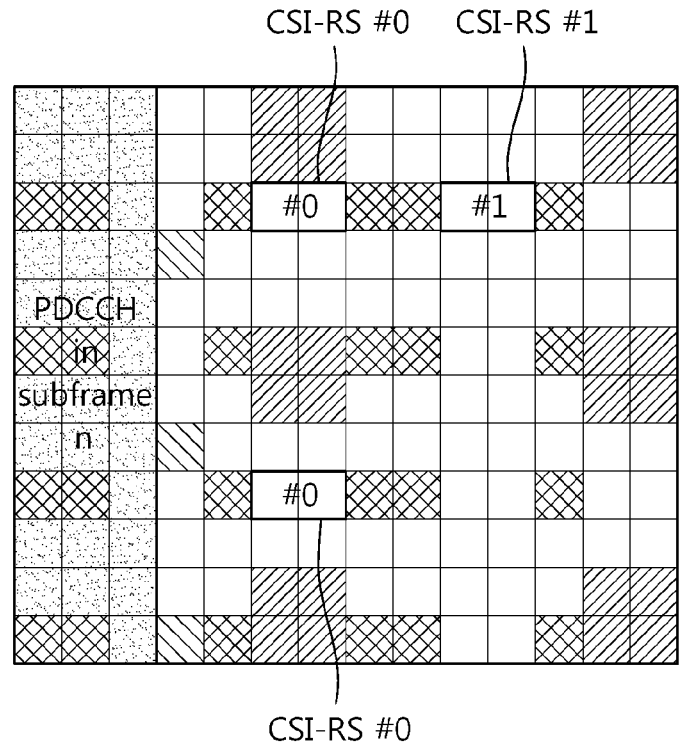
FIG. 11 shows an example in which a plurality of CSI-RSs transmitted in the same subframe is configured for the same UE.

FIG. 11 shows an example in which a plurality of CSI-RSs transmitted in the same subframe is configured for the same UE.

Referring to FIG. 11, CSI-RS #0 and #1 are transmitted in a subframe n. The CSI-RS #0 may be a CSI-RS transmitted by a node #N, and the CSI-RS #1 may be a CSI-RS transmitted by a node #M.

As described above, a plurality of CSI-RSs may be configured for the same UE. Here, if a BS requests aperiodic CSI from the UE, the UE must send a CSI request field (e.g., a CQI request field) in each subframe in which the reference signal is transmitted, in a conventional method. If, as in a multiple node system, a plurality of reference signals is transmitted to UE in different subframes, inefficiency may occur and resources may be wasted in a conventional method because a CSI request field must be repeatedly transmitted in each subframe.

In order to solve the problems, the present invention provides a method of performing aperiodic CSI feedback for a plurality of reference signals in such a manner that a BS triggers CSI feedback by sending a CSI request field to UE once.

Figure 12:
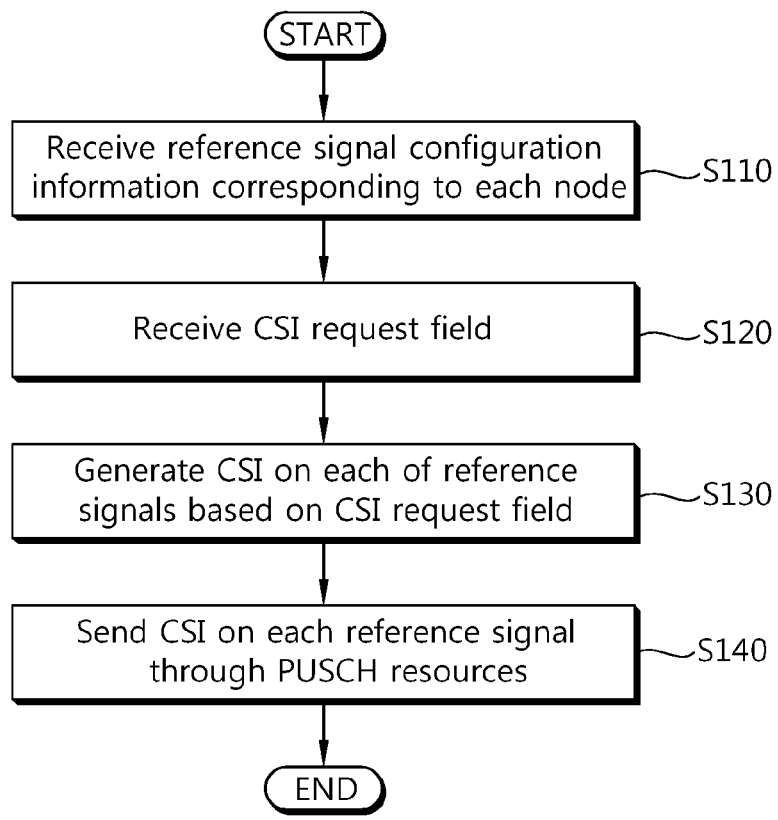
FIG. 12 shows a method of UE sending CSI according to an embodiment of the present invention.

FIG. 12 shows a method of UE sending CSI according to an embodiment of the present invention.

Referring to FIG. 12, the UE receives reference signal configuration information corresponding to each node at step S110.

The reference signal configuration information may be received through a higher layer signal, such as an RRC message, and it may inform that what reference signal is transmitted by each node. For example, the reference signal configuration information may inform the configuration of a CSI-RS transmitted by each node.

The UE receives a CSI request field at step S120. The CSI request field triggers aperiodic CSI reporting for the UE. The existing CSI request field includes a request for CSI feedback for a specific cell or a specific carrier. In contrast, the CSI request field according to the present invention may include a request for CSI feedback for a plurality of reference signals.

Table below shows an example of the CSI request field.

TABLE 11

| VALUE OF CSI REQUEST FIELD | DESCRIPTION |
|---|---|
| '000' | No aperiodic CSI report is triggered |
| '001' | Aperiodic CSI report is triggered for serving cell $c$ |
| '010' | Aperiodic CSI report is triggered for a $1^{st}$ set of serving cells configured by higher layers |
| '011' | Aperiodic CSI report is triggered for a $2^{nd}$ set of serving cells configured by higher layers |
| '100' | Aperiodic CSI report is triggered for a $1^{nd}$ set of reference signals or antenna ports configured by higher layers |
| '101' | Aperiodic CSI report is triggered for a $2^{nd}$ set of reference signals or antenna ports configured by higher layers |

As shown in Table 11, if a value of the CSI request field is '100' or '101', a CSI report on a first or second set of reference signals may be triggered. The first set or the second set may denote a set of reference signals configured by a higher layer signal, and the reference signal may be a CSI-RS transmitted by each node.

For example, the first set may be a set of a plurality of reference signals transmitted in different subframes, as in the CSI-RSs #0 and #1 illustrated in FIG. 10. Furthermore, the second set may be a set of a plurality of reference signals transmitted in the same subframe, as in the CSI-RSs #0 and #1 illustrated in FIG. 11. However, Table 11 is only illustrative, and the first or second set may denote a combination of other reference signals or a combination of other nodes.

For example, a CSI request field may include 1. A request for CSI when only some of antenna ports in which a specific CSI-RS is transmitted participate in PDSCH transmission or 2. A request for CSI when all antenna ports in which a CSI-RS is transmitted participate in PDSCH transmission.

From a viewpoint of UE, a CSI request field may be included in DCI and received through PDCCHs. The DCI including the CSI request field may be pieces of DCI for scheduling PUSCHs, such as the DCI format 0 and the DCI format 4.

In some embodiments, the CSI request field may be received through a higher layer signal, such as an RRC message.

The UE measures a plurality of reference signals in response to the CSI request field and generates CSI on each of the reference signals at step S130. The CSI may be a CQI, but not limited, and it is evident that the CSI may include a Rank Indicator (RI), a Precoding Matrix Indicator (PMI), etc.

The UE sends the CSI on each of the reference signals through PUSCH resources at step S140. The PUSCH resources may exist within one subframe or may exist within a plurality of subframes.

A process in which UE generates CSI in response to a CSI request field and then sends the CSI through PUSCH resources is described in detail below.

In the present invention, a CSI request field is not transmitted in all subframes whose reference signals must be measured in order to generate CSI. That is, in the prior art, if a CSI request field is included in a DCI format including UL scheduling information, UE measures a reference signal in a valid DL subframe in which the CSI request field has been received and generates CSI based on the measurement. In contrast, in the present invention, if reference signals that must be measured by UE are placed in a plurality of subframes, a CSI request field may be transmitted in only some of the plurality of subframes.

UE may know that CSI on what reference signal must be generated based on a value of a CSI request field and also know the transmission cycle, subframe offset, pattern, etc. of each reference signal through a higher layer signal, such as an RRC message. Accordingly, UE may know the position of a reference signal (i.e., CSI reference resources), that is, the subject of measurement through a CSI request field and a higher layer signal.

Figure 13:
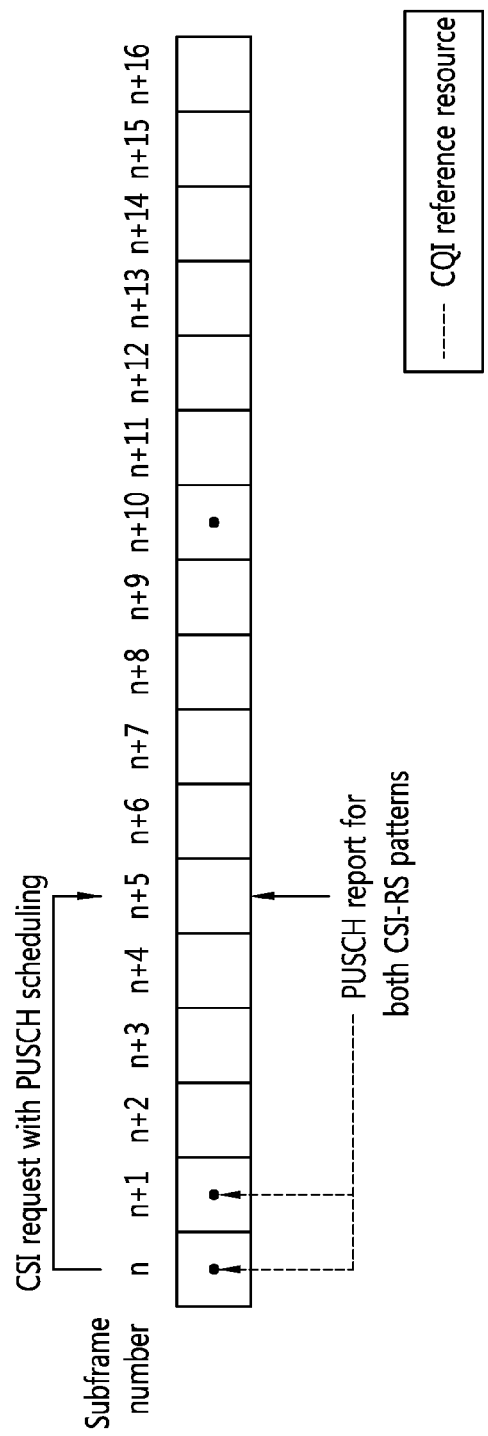
FIG. 13 shows a method of transmitting a CSI request field and feeding back CSI according to an embodiment of the present invention.

FIG. 13 shows a method of transmitting a CSI request field and feeding back CSI according to an embodiment of the present invention. It is assumed that UE is requested to report aperiodic CSI on CSI-RSs which are transmitted in subframes n and n+1.

Referring to FIG. 13, a BS sends a CSI request field in the subframe n through DCI including PUSCH scheduling information. Furthermore, the BS sends the CSI-RSs in the subframe n and the subframe n+1.

In this case, UE analyzes CSI reference resources up to the subframe n+1 without being limited to the subframe n. That is, the UE includes the valid DL subframe n+1, placed posterior to the subframe n including the CSI request field, in the CSI reference resources.

Figure 14:
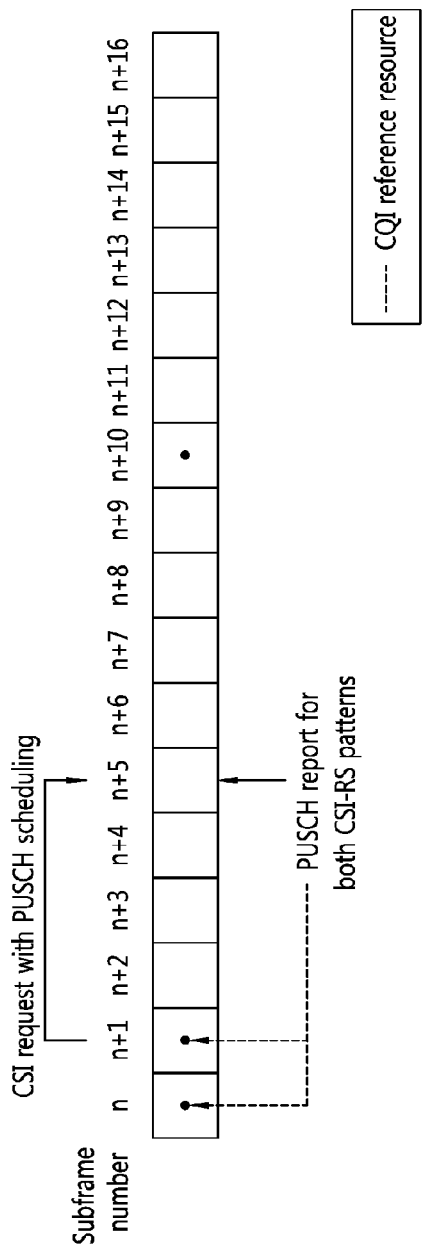
FIG. 14 shows another method of transmitting a CSI request field and feeding back CSI according to an embodiment of the present invention.

FIG. 14 shows another method of transmitting a CSI request field and feeding back CSI according to an embodiment of the present invention. It is assumed that UE is requested to report aperiodic CSI on CSI-RSs which are transmitted in subframes n and n+1.

Referring to FIG. 14, a BS sends a CSI request field through DCI, including PUSCH scheduling information, in the subframe n+1. The UE includes the valid DL subframe n, placed anterior to the subframe n+1 including the CSI request field, in the CSI reference resources.

That is, in the prior art, CSI on only a subframe in which a CSI request field is transmitted is measured. In contrast, in the present invention, CSI is measured with consideration taken of a subframe in which a CSI request field is not transmitted, and the measured CSI is reported.

FIGS. 13 and 14 show examples in which UE sends CSI on CSI-RSs received in a plurality of subframes through a single subframe, but not limited thereto.

That is, UE may send CSI through a plurality of subframes. In this case, DCI including a CSI request field may include pieces of PUSCH scheduling information for scheduling a plurality of PUSCH resources.

In some embodiments, a plurality of PUSCH resources may be previously defined so that they are consecutively allocated physically or logically. In this case, a piece of PUSCH scheduling information and the number of allocated PUSCHs may be informed so that the plurality of PUSCH resources can be scheduled.

In the present invention, the multiple node system has been described as an example in order to help understanding of contents, but not limited thereto. That is, the present invention may be applied to any system in which multiple CSI-RSs are configured. Furthermore, a CQI has been chiefly described as an example of CSI, but an RI, a PMI, etc. may become an example of CSI.

Figure 15:
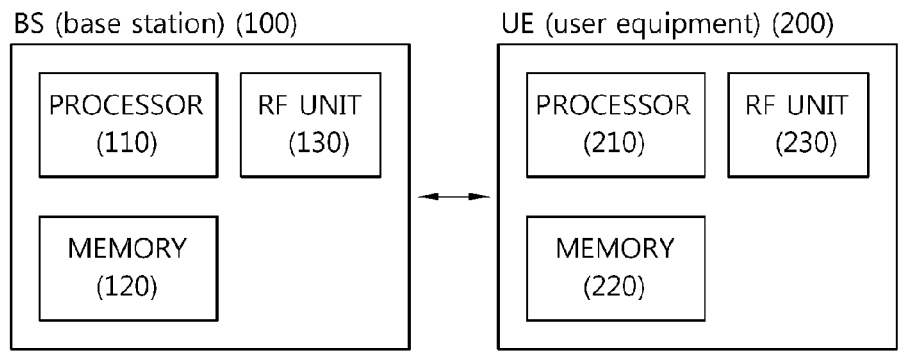
FIG. 15 is a block diagram showing a BS and UE.

FIG. 15 is a block diagram showing a BS and UE.

The BS 100 includes a processor 110, memory 120, and a Radio Frequency (RF) unit 130. The processor 110 implements the proposed functions, processes, and methods. For example, the processor 110 may send reference signal configuration information, informing the configuration of reference signals allocated to each node, to UE. Furthermore, the processor 110 may send a CSI request field, but the CSI request field is transmitted in only some of subframes in which a plurality of reference signals is transmitted. The memory 120 is coupled to the processor 110 and is configured to store various pieces of information for driving the processor 110. The RF unit 130 is coupled to the processor 110 and is configured to send and/or receive radio signals. The RF unit 130 may be formed of a plurality of nodes coupled to the BS 100 in a wired manner.

The UE 200 includes a processor 210, memory 220, and an RF unit 230. The processor 210 performs the above-described functions and methods. For example, the processor 210 may receive reference signal configuration information and a CSI request field from a BS or a node. The CSI request field may be included in DCI or received through a higher layer signal, such as an RRC message. The UE generates CSI on a plurality of reference signals (e.g., CSI-RSs transmitted by respective nodes) based on a value of a CSI request field and sends the CSI. In this case, the CSI-RSs may be received in a plurality of subframes or may be received in a single subframe. The generated CSI may be transmitted through a single PUSCH or a plurality of PUSCHs. The memory 220 is coupled to the processor 210 and is configured to store various pieces of information for driving the processor 210. The RF unit 230 is coupled to the processor 210 and is configured to send and/or receive radio signals.

The processor 110, 210 may include Application-Specific Integrated Circuits (ASICs), other chipsets, logic circuits, or data processors and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented using a module (process or function) that performs the above function. The module may be stored in the memory 120, 220 and executed by the processor 110, 210. The memory 120, 220 may be placed inside or outside the processor 110, 210 and connected to the processor 110, 210 using a variety of well-known means.

The present invention may be implemented using hardware, software, or a combination of them. In hardware implementations, the present invention may be implemented using Application Specific Integrated Circuits (ASICs), Digital Signal Processors (DSPs), Programmable Logic Devices (PLDs), Field Programmable Gate Arrays (FPGAs), processors, controllers, microprocessors, other electronic units, or a combination of them, which are designed to perform the above function. In software implementations, the present invention may be implemented using a module performing the above function. The software may be stored in the memory and executed by the processor. The memory or the processor may adopt various means well known to those skilled in the art.

Although the preferred embodiments of the present invention have been described in detail, a person having ordinary skill in the art will appreciate that the present invention may be modified in various ways without departing from the spirit and scope of the present invention defined in the appended claims. Accordingly, a change of future embodiments of the present invention may not deviate from the technology of the present invention.

The invention claimed is:

1. A method of User Equipment (UE) transmitting aperiodic channel state information, the method comprising:
receiving a channel state information (CSI) request field;
generating channel state information if the CSI request field is set to trigger a CSI report; and
transmitting the channel state information through a Physical Uplink Shared Channel (PUSCH),
wherein a value of the CSI request field comprises a first value which triggers an aperiodic CSI report for a first set of reference signals and a second value which triggers an aperiodic CSI report for a second set of reference signals, and
wherein the first set and the second set of reference signals are configured by a higher layer signal.

2. The method of claim 1, wherein the CSI request field is included in Downlink Control Information (DCI) on which the PUSCH is scheduled.

3. The method of claim 1, wherein the plurality of reference signals is placed in a plurality of downlink subframes.

4. The method of claim 1, further comprising receiving reference signal configuration information for the plurality of reference signals.

5. The method of claim 1, wherein the channel state information is generated by measuring the plurality of reference signals.

6. The method of claim 1, wherein the CSI request field comprises 2 bits.

7. User Equipment (UE), comprising:
a Radio Frequency (RF) unit configured to transmit and receive radio signals; and
a processor coupled to the RF unit, wherein the processor is configured to:
receive a channel state information (CSI) request field;
generate channel state information if the CSI request field is set to trigger a CSI report; and
transmit the channel state information through a Physical Uplink Shared Channel (PUSCH),
wherein a value of the CSI request field comprises a first value which triggers an aperiodic CSI report for a first set of reference signals and a second value which triggers an aperiodic CSI report for a second set of reference signals, and
where the first set and the second set of reference signals are configured by a higher layer signal.

8. The UE of claim 7, wherein the CSI request field is included in Downlink Control Information (DCI) on which the PUSCH is scheduled.

9. The UE of claim 7, wherein the plurality of reference signals is placed in a plurality of downlink subframes.

10. The UE of claim 7, wherein the processor is further configured to:
receives reference signal configuration information for the plurality of reference signals.

11. The UE of claim 7, wherein the channel state information is generated by measuring the plurality of reference signals.

12. The UE of claim 7, wherein the CSI request field comprises 2 bits.

* * * * *